(12) United States Patent
Yamaoka et al.

(10) Patent No.: US 10,747,398 B2
(45) Date of Patent: Aug. 18, 2020

(54) DISPLAY DEVICE AND PRINTING APPARATUS

(71) Applicant: Brother Kogyo Kabushiki Kaisha, Nagoya-shi, Aichi-ken (JP)

(72) Inventors: Hiroyuki Yamaoka, Kasugai (JP); Yoshiyasu Yoshido, Anpachi-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 388 days.

(21) Appl. No.: 15/279,985

(22) Filed: Sep. 29, 2016

(65) Prior Publication Data

US 2017/0185247 A1   Jun. 29, 2017

(30) Foreign Application Priority Data

Dec. 24, 2015   (JP) .................................. 2015-251201

(51) Int. Cl.
*G06F 3/0482* (2013.01)
*G06K 15/02* (2006.01)
(Continued)

(52) U.S. Cl.
CPC ........ *G06F 3/0482* (2013.01); *G06F 3/04847* (2013.01); *G06K 15/022* (2013.01);
(Continued)

(58) Field of Classification Search
CPC ............... G06F 3/0482; G06F 3/04847; G06F 3/04817; G09G 5/003; G06K 15/028; G06K 15/022; G06K 2215/0097
See application file for complete search history.

(56) References Cited

U.S. PATENT DOCUMENTS

| | | | | |
|---|---|---|---|---|
| 2005/0039122 A1* | 2/2005 | Meadows | ............. | G06F 17/211 |
| | | | | 715/255 |
| 2007/0211263 A1* | 9/2007 | Hoshino | ............ | H04N 1/00408 |
| | | | | 358/1.1 |

(Continued)

FOREIGN PATENT DOCUMENTS

| | | |
|---|---|---|
| JP | 2008-162236 A | 7/2008 |
| JP | 2011-257887 A | 12/2011 |

OTHER PUBLICATIONS

Jun. 26, 2018—(JP) Notification of Reasons for Rejection—App 2015-251201.

*Primary Examiner* — Jeanette J Parker
(74) *Attorney, Agent, or Firm* — Banner & Witcoff, Ltd.

(57) ABSTRACT

A display device, having a screen, a memory device storing a plurality of setup items, and a controller connected with the screen and the memory, is provided. Each of the setup items includes information concerning a setting for a character to be printed on a printable medium. The controller controls the screen to display the character to be printed; a plurality of icons, each of which identifies one of the setup items; and a setup window, in which a subject setup item and one of setting options for the subject setup item are displayed in association with a subject icon identifying the subject setup item among the plurality of icons being displayed. The controller accepts selection of one of the setting options for the subject setup item and designates the accepted one of the setting options to be the setting for the subject setup item.

9 Claims, 9 Drawing Sheets

(51) Int. Cl.
  *G06F 3/0484* (2013.01)
  *G09G 5/14* (2006.01)
(52) U.S. Cl.
  CPC ....... *G06K 15/028* (2013.01); *G06K 15/1805*
    (2013.01); *G06K 2215/0097* (2013.01); *G09G*
    *5/14* (2013.01); *G09G 2340/0464* (2013.01)

(56) References Cited

U.S. PATENT DOCUMENTS

| | | | | |
|---|---|---|---|---|
| 2009/0006956 | A1* | 1/2009 | Bae | G06F 3/0481 |
| | | | | 715/708 |
| 2011/0035665 | A1* | 2/2011 | Kim | G06F 3/04883 |
| | | | | 715/702 |
| 2011/0271222 | A1* | 11/2011 | Cho | G06F 3/0481 |
| | | | | 715/773 |
| 2011/0286012 | A1* | 11/2011 | De Munck | B41J 3/4075 |
| | | | | 358/1.6 |
| 2014/0019885 | A1* | 1/2014 | Jung | G06F 3/0481 |
| | | | | 715/758 |
| 2014/0281934 | A1* | 9/2014 | Zhang | G06F 17/212 |
| | | | | 715/243 |
| 2015/0339093 | A1* | 11/2015 | Cho | G06F 3/1431 |
| | | | | 345/1.2 |
| 2016/0147722 | A1* | 5/2016 | Hariharan | G06F 16/25 |
| | | | | 715/255 |
| 2016/0162177 | A1* | 6/2016 | Kim | G06F 3/0482 |
| | | | | 715/863 |

* cited by examiner

DISPLAY DEVICE AND PRINTING APPARATUS

CROSS-REFERENCE TO RELATED APPLICATION

This application claims priority under 35 U.S.C. § 119 from Japanese Patent Application No. 2015-251201, filed on Dec. 24, 2015. The entire subject matter of the application is incorporated herein by reference.

BACKGROUND

Technical Field

The following description is related to an aspect of a display device capable of displaying one or more characters to be printed on a printable medium and a printing apparatus having the display device.

Related Art

A printing apparatus having a display device capable of displaying one or more characters to be printed on a printable medium, so that a user viewing the characters may edit the characters through a screen of the display device, is known. The printing apparatus may control the display device to display information concerning printer settings alongside the characters.

For example, a tape printing system with a liquid crystal display (LCD), which includes a dots-display unit and is capable of displaying an attribute indicator, is known. The dots-display unit may display characters, a row number, and a preview image of the characters on the printable medium. The attribute indicator may indicate settings for a plurality of print setup items. The print setup items may include, for example, size, font, and a paragraph style for the characters. Setting options for the font may include, for example, Ming style and gothic. In the tape printing system, when a user presses a predetermined key, a selective screen, through which the user may designate one of specific setup options corresponding to the pressed key to be the setting for the character, may be displayed. The selective screen may present one or more setting options for the specific setup item, and the user may select one of the setting options for the specific setup items to designate the print setting.

SUMMARY

According to the known tape printing system, however, a user may find it difficult to grasp correspondence or association between the setup item indicated in the attribute indicator and the setting options that may be designated through the selection screen.

The present disclosure is advantageous in that a display device for displaying an image, through which one of setting options for a setup item is selectable, in such manner that a user may recognize association between the setting options and the setup item easily, is provided. Further, the present disclosure is advantageous in that a printing apparatus having the display device is provided.

According to an aspect of the present disclosure, a display device, including a screen configured to display images; a first display unit configured to display a character that is to be printed on a printable medium on the screen; a second display unit configured to display a plurality of icons on the screen, each of the plurality of icons identifying one of a plurality of setup items, each of the plurality of setup items being information concerning a setting for the character displayed by the first display unit to be printed on the printable medium; a third display unit configured to display a setup window, through which a setting for a subject setup item being one of the plurality of setup items is designated, on the screen in association with a subject icon identifying the subject setup item among the plurality of icons displayed by the second display unit; an accepting unit configured to accept a setting option for the subject setup item; and a setup unit configured to designate the setting option accepted by the accepting unit to be the setting for the subject setup item, is provided.

According to another aspect of the present disclosure, a printing apparatus, including a display device, a medium mount, and a printing unit, is provided. The display device includes a screen configured to display images; a first display unit configured to display a character that is to be printed on a printable medium on the screen; a second display unit configured to display a plurality of icons on the screen, each of the plurality of icons identifying one of a plurality of setup items, each of the plurality of setup items being information concerning a setting for the character displayed by the first display unit to be printed on the printable medium; a third display unit configured to display a setup window, through which a setting for a subject setup item being one of the plurality of setup items is designated, on the screen in association with a subject icon identifying the subject setup item among the plurality of icons displayed by the second display unit; an accepting unit configured to accept a setting option for the subject setup item; and a setup unit configured to designate the setting option accepted by the accepting unit to be the setting for the subject setup item. The printable medium is installable in the medium mount. The printing unit is configured to print the character being displayed by the first display unit on the printable medium installed in the medium mount according to each setting for the plurality of setup items.

According to another aspect of the present disclosure, a display device including a screen configured to display images and a controller configured to control displaying the images on the screen is provided. The controller controls displaying the images by displaying a character that is to be printed on a printable medium on the screen; displaying a plurality of icons, each of which identifies one of a plurality of setup items, on the screen, each of the plurality of setup items being information concerning a setting for the character displayed on the screen to be printed on the printable medium; displaying a setup window, through which a setting for a subject setup item being one of the plurality of setup items is designated, on the screen in association with a subject icon identifying the subject setup item among the plurality of icons displayed; accepting a setting option for the subject setup item; and designating the accepted setting option to be the setting for the subject setup item.

BRIEF DESCRIPTION OF THE ACCOMPANYING DRAWINGS

DETAILED DESCRIPTION

Figure 1:
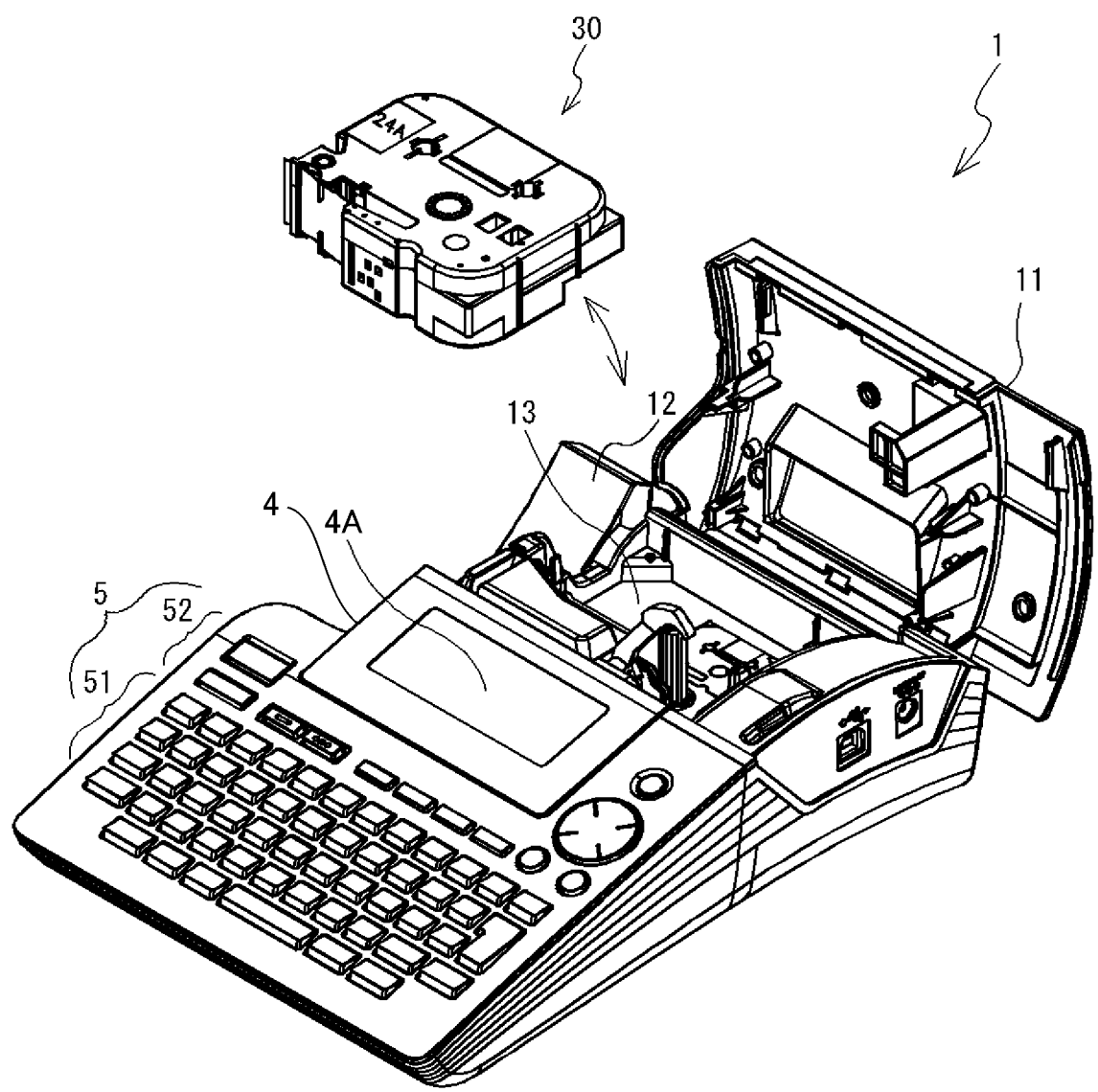
FIG. 1 is an illustrative perspective view of a printing apparatus according to an exemplary embodiment of the present disclosure.

Hereinafter, an exemplary configuration of a printing apparatus 1 according to an embodiment of the present disclosure will be described with reference to the accompanying drawings. In the following description, directions relative to the printing apparatus 1 will be cited with reference to a user's ordinary position to use the printing apparatus 1. For example, in FIG. 1, a viewer's upward, downward, lower-leftward, upper-rightward, upper-leftward, and lower-rightward directions will be referred to as upward, downward, frontward, rearward, leftward, and rightward directions in the printing apparatus 1, respectively. An up-to-down or down-to-up direction may be referred to as a vertical direction, and a front-to-rear or rear-to-front direction may be referred to as a front-rear direction. Further, a left-to-right or right-to-left direction may be referred to as a widthwise direction.

[Overall Configuration of the Printing Apparatus]

The printing apparatus 1 is a printer, which may produce a label by forming dots on a printable medium. On an upper face of the printing apparatus 1, arranged are character keys 51, through which characters, including alphabet, symbols, and numerical figures, may be entered. In rearward positions with respect to the character keys 51, i.e., in upper-rightward positions in FIG. 1, arranged are function keys 52, which may include a power key, a print key, a setup key, direction keys, an enter key, and a cancel key (unsigned). The direction keys may include an upward key, a downward key, a leftward key, and a rightward key, through which the user may designate one of options presented to the user. In the following description, the character keys 51 and the function keys 52 may be collectively referred to as a keyboard 5. In a rearward position with respect to the function keys 52, arranged is a display device 4. In an upper-rearward position in the printing apparatus 1, arranged is a cover 11 that may be opened and closed. On a rear-leftward corner of the printing apparatus 1, arranged is a tape tray 12 to catch a piece of tape, which may have the printed dots there on, having been cut off by a cutter (not shown).

In a rearward position with respect to the display device 4, arranged is a cassette mount 13, in which a removable tape cassette 30 may be installed. The printing apparatus 1 may print characters input through the character keys 51 on a piece of tape in the tape cassette 30 installed in the cassette mount 13. In the cassette mount 13, arranged is a sensor 6 (see FIG. 2) to detect a type of the tape cassette 30 in the cassette mount 13. The type of the tape cassette 30 may be classified by, for example, a width and a color of the tape contained therein. The width of the tape may vary among, for example, 36 mm, 24 mm, 18 mm, 12 mm, 9 mm, and 6 mm. The color of the tape may vary among, for example, transparent, white, red, blue, yellow, and green. The cover 11 is arranged in a rearward position with respect to the cassette mount 13. The cover 11 is openable and closable, and, when in a closed position, covers the tape cassette 30. The user may open the cover 11 to exchange the tape cassettes 30. The tape cassette 30 may store rolls of an ink ribbon, a base tape, and a cover film.

The printing apparatus 1 may pull the ink ribbon, the base tape, and the cover film, which together form a piece of tape, from the rolls in the tape cassette 30. The ink ribbon may be heated in the printing apparatus 1 by a thermal head 10, and characters may be printed on the cover film. Further, the base tape may be bonded to the cover film with the printed characters. Thus, a label having the cover film with the characters printed thereon and the base tape bonded to the cover film may be produced.

[Electrical Configuration of the Printing Apparatus]

Figure 2:
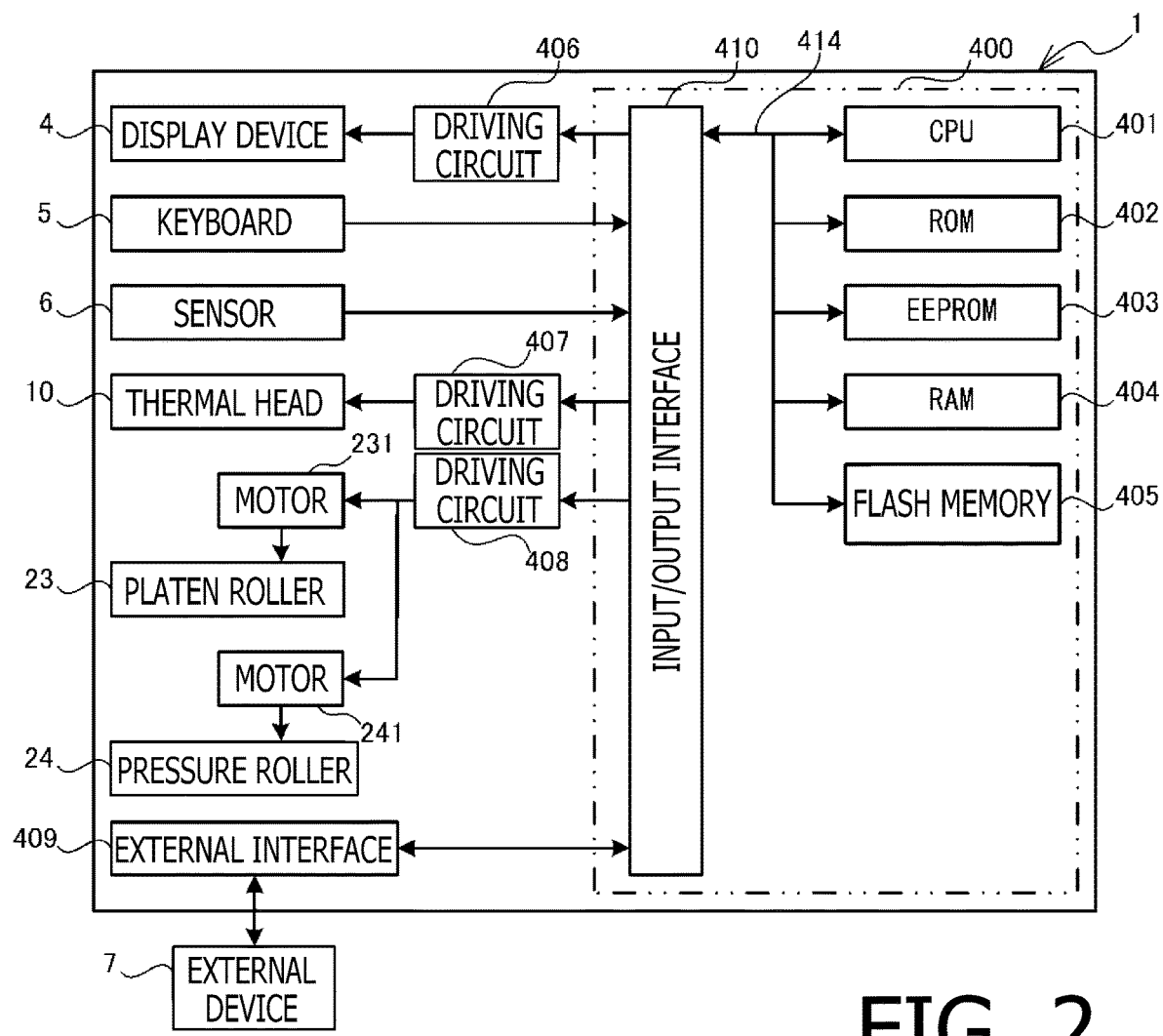
FIG. 2 is a block diagram to illustrate an electrical configuration in the printing apparatus according to the exemplary embodiment of the present disclosure.

The electrical configuration of the printing apparatus 1 will be described with reference to FIG. 2. As shown in FIG. 2, the printing apparatus 1 includes a control circuit 400. The control circuit 400 is formed on a control board (not shown), which may be fixed to an interior surface of the printing apparatus 1. The control circuit 400 includes a central processing unit (CPU) 401, a read-only memory (ROM) 402, an electrically erasable programmable ROM (EEPROM) 403, a random-access memory (RAM) 404, a flash memory 405, and an input/output (I/O) interface 410, which are mutually connected through a bus 414.

The CPU 401 controls overall behaviors and actions in the printing apparatus 1. The ROM 402 stores programs to be executed by the CPU 401, including a program to conduct a main process (see FIG. 3). The CPU 401 may conduct various types of computations based on the programs stored in the ROM 402. The EEPROM 403 may store dot-pattern data for printing, which is used to print characters, including alphabets, symbols, numerical figures, and barcodes. The dot-pattern data may be classified by fonts and sizes of the characters and stored in the EEPROM 403 in association with coding data. The RAM 404 may store temporary data. The flash memory 405 may store setup information, option information, printability information, and print data, which will be described below.

The setup information defines settings for printing characters which are displayed in the display device 4 on the printable medium. The setup information indicates appearance settings for a plurality of setup items to print the characters. The setup items may include, for example, "font," "size," "style," "alignment," "character width," "leading," and "underline."

The option information defines a plurality of setting options applicable to each of the setup items. For example, for the setup item "font," options of "Helsinki" and "Ming style" may be provided. For the setup item "size," options of "auto," "7 points," "9 points," "12 points," "18 points," "24 points," "36 points," and "48 points" may be provided. For the setup item "style," options of "regular," "bold," "open face," "shaded," "steric," and "italic" may be provided. For the setup item "alignment," options of "left alignment," "center alignment," "right alignment," and "justified" may be provided. For the setup item "character width," options of "*1," "*3/2," "*1/2," "*2/3" may be provided. For the setup item "leading," options of "regular" and "narrow" may be provided. For the setup item "underline," options of "no line," "underline," and "strikethrough" may be provided. Among the plurality of options for each setup item, one of the options is designated and indicated in the setup information as a setting for the setup item.

The printability information defines a printable condition or feasibility for the printing apparatus 1 to print characters for each setting on basis of the type of the tape. For example, for a tape with the width of "36 mm," a printable condition in conformity with the setup item "size" may be one of options that range from "7 points" to "48 points." In other words, sizes that are outside this range are not applicable to the tape width of "36 mm." Meanwhile, for a tape with the width of "6 mm," a printable condition in conformity with the setup item "size" may be one of options that range from "7 points" to "12 points." In other words, sizes that are outside this range are not applicable to the tape width of "6 mm."

The print data is used to print the characters being displayed in the display device 4 in the appearance designated in the setup information. The CPU 401 drives driving circuits 407, 408, which will be described later, according to the print data. Thus, the printing apparatus 1 may print the characters displayed in the display device 4 in the appearance designated in the setup information according to the print data.

The I/O interface 410 is connected with the keyboard 5, the sensor 6, the driving circuits 406, 407, 408, and an external interface 409. The driving circuit 406 includes a video RAM (not shown) to display images on the display device 4 and controls behaviors of the display device 4. The keyboard 5 outputs signals indicating the keys that are operated by the user to the I/O interface 410. The driving circuit 407 controls electricity to a heating element in the thermal head 10. The driving circuit 408 drives motors 231, 241 to rotate. The motor 231 is connected to a platen roller 23, which presses the cover film and the ink ribbon against the thermal head 10 and is driven by the rotation of the motor 231 to rotate. The motor 241 is connected to a pressure roller 24, which presses the cover film with the printed characters thereon against the base tape and is driven by the rotation of the motor 241 to rotate. The external interface 409 is an integrated circuit for the printing apparatus 1 to communicate with an external device 7. The external device 7 may be a known personal computer.

[Main Process]

Referring to FIGS. 3-10, the main process to be conducted in the printing apparatus 1 will be described. The main process may be activated, when an operation to the power key in the keyboard 5 is performed, by the CPU 401 executing the program stored in the ROM 402. In S11, the CPU 401 determines a type of the tape cassette 30 installed in the cassette mount 13 through the sensor 6. Further, the CPU 401 determines a type of the tape in the tape cassette 30 based on the determined type of the tape cassette 30.

Figure 4:
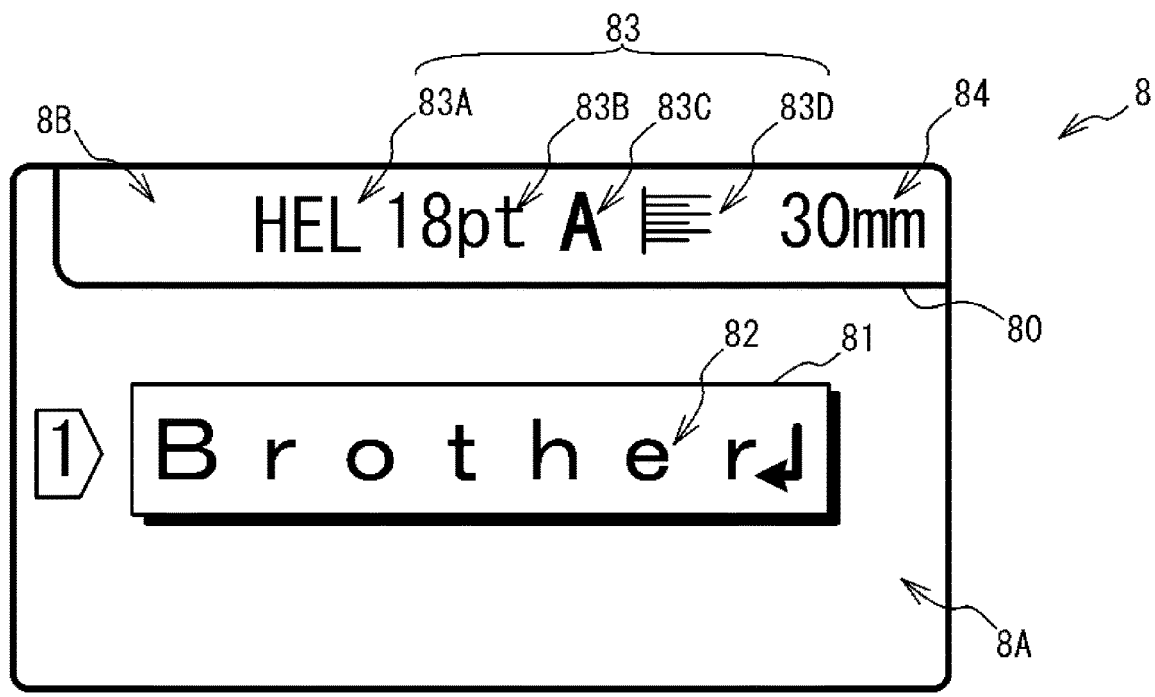
FIG. 4 is an illustrative view of an editorial screen in the printing apparatus according to the exemplary embodiment of the present disclosure.
Figure 5:
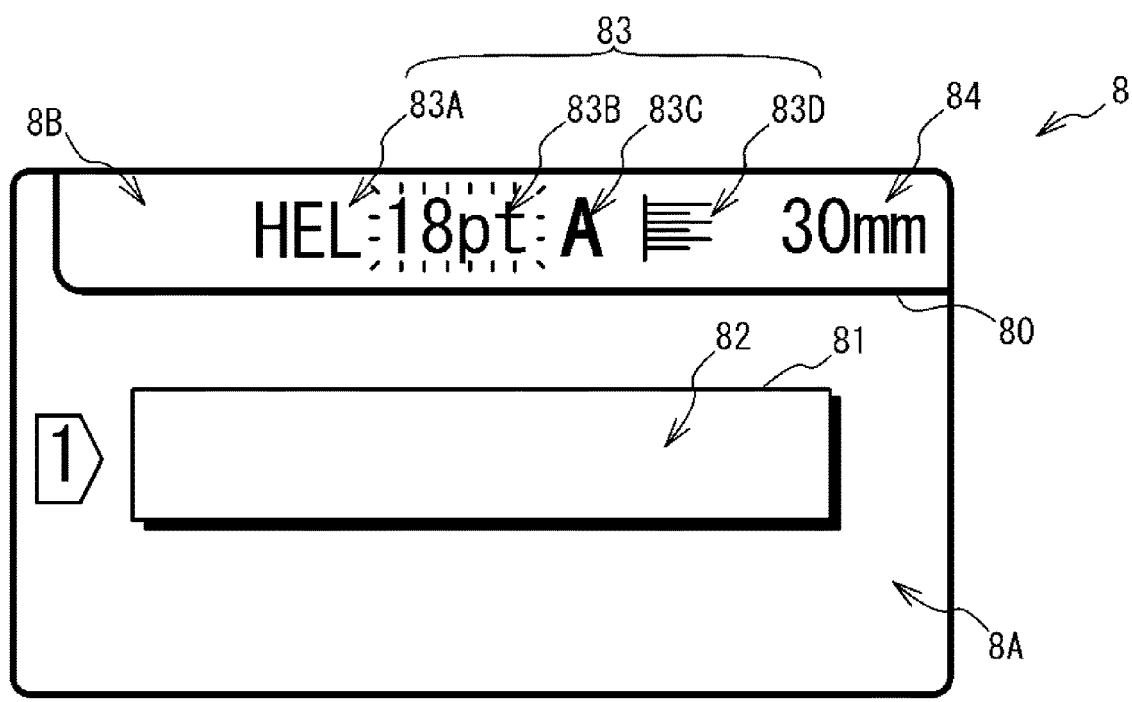
FIG. 5 is another illustrative view of the editorial screen in the printing apparatus according to the exemplary embodiment of the present disclosure.
Figure 6:
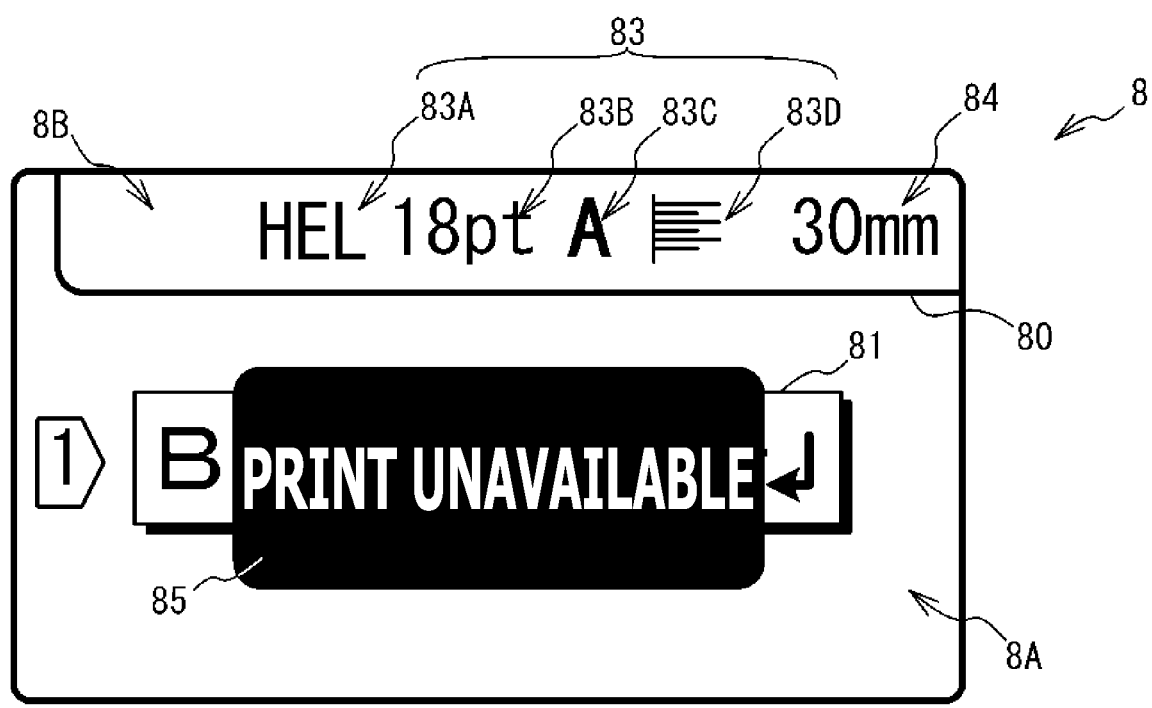
FIG. 6 is another illustrative view of the editorial screen in the printing apparatus according to the exemplary embodiment of the present disclosure.

In S15, the CPU 401 displays an editorial screen 8 (see FIG. 4) on the display 4A in the display device 4. As shown in FIG. 4, the editorial screen 8 includes two (2) areas, which are divided by a divider line 80. An area lower than the divider line 80 will be referred to as an editor area 8A, and an area higher than the divider line 80 will be referred to as a guidance area 8B. The editor area 8A displays a tape image 81, which is a rectangle representing an outline of a piece of tape. Inside the tape image 81, displayed may be an image of a character 82, which includes one or more characters entered by the user pressing the character keys 51. However, at the instant of S15, where no character is yet entered by the user, unlike the illustration in FIG. 4, no character 82 should appear in the tape image 81.

In S15, the CPU 401 further displays icons 83, including a plurality of icons 83A-83D (see FIG. 4), in the guidance area 8B based on the setup information stored in the flash memory 405. The icons 83 may identify some of the setup items and include symbols that may represent the settings for the some of the setup items designated in the setup information. For example, the icon 83A may indicate that the setting for the setup item "font" is "Helsinki." The icon 83B may indicate that the setting for the setup item "size" is "18 points." The icon 83C may indicate that the setting for the setup item "style" is "bold." The icon 83D may indicate that the setting for the setup item "alignment" is "left alignment." Meanwhile, no icon representing the settings for the setup items "character width," "leading," or "underline" may be displayed. In the following description, each icon 83 (icon 83A, 83B, 83C, or 83D) representing a setting for a setup item may be referred to as an icon 83 corresponding to the setup items.

Further, the CPU 401 determines a width of the tape, of which type is determined in S11 (see FIG. 3), and displays a text string (e.g., "30 mm") indicating the determined tape width on a right-hand side of the icons 83 as a tape width 84 (see FIG. 4).

Figure 3:
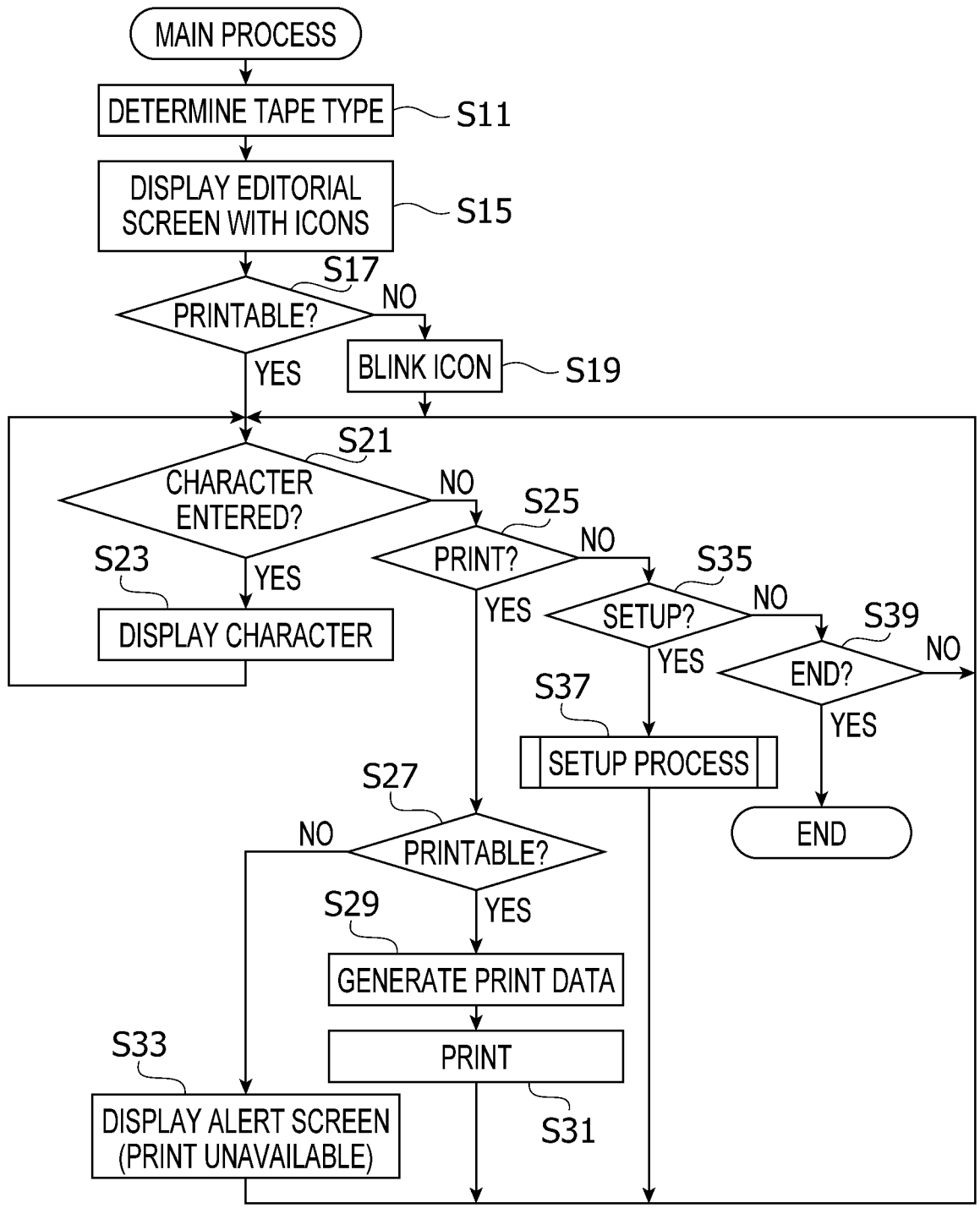
FIG. 3 is a flowchart to illustrate a flow of steps in a main process to be conducted in the printing apparatus according to the exemplary embodiment of the present disclosure.

In S17, as shown in FIG. 3, the CPU 401 determines the printable condition applied to the type of the tape determined in S11 based on the printability information stored in the flash memory 405. Further, the CPU 401 determines whether the plurality of settings designated in the setup information stored in the flash memory 405 should meet the printable condition to determine the printability of the printing apparatus 1 for the current tape type determined in S11. If the settings designated in the setup information are all determined to be in conformity with the printable condition, the CPU 401 may determine that the printing apparatus 1 is in a condition to print characters according to the setup information (S17: YES), and the flow proceeds to S21. If at least one of the settings designated in the setup information does not meet the printable condition applied to the tape type, the CPU 401 determines that the printing apparatus 1 is not in the condition to print characters according to the setup information (S17: NO), and the flow proceeds to S19. In S19, the CPU 401 manipulates one of the icons 83A-83D in the icons 83 corresponding to the setting that is determined not to meet the printable condition in a different manner from the remainder of the icons 83A-83D. The different manner may be, for example, blinking. In other words, one of the icons 83A-83D corresponding to the setting that is determined not to meet the printable condition may be displayed to blink while the remainder of the icons 83A-83D is steadily displayed. The flow proceeds to S21.

For example, the printability information may designate the printable condition for the setup item "size" corresponding to the tape width "6 mm" should be in the range from "7 points" to "12 points." Meanwhile, in S11, the tape width may be determined to be "6 mm." Further, the setup information stored in the flash memory 405 may designate the setting of "18 points" for the setup item "size." Under this circumstance, the CPU 401 may determine that the setting "18 points" for the setup item "size" does not meet the printable condition "from 7 points to 12 points" for the tape width "6 mm" (S17: NO). Therefore, in S19, the icon 83B representing the setting of "18 points" may be displayed to blink (see FIG. 5).

In S21, as shown in FIG. 3, the CPU 401 determines whether an operation to enter one or more characters is performed through the character keys 51 in the keyboard 5. If the CPU 1 determines that the operation to enter characters is performed (S21: YES), the flow proceeds to S23. In S23, the CPU 401 displays the character 82, i.e., a text string containing the characters entered by the user, inside the tape image 81 in the editorial screen 8 (see FIG. 4). The CPU 401 stores information corresponding to the entered characters in the RAM 404. The flow returns to S21. For example, as shown in FIG. 4, in response to the operation to enter the characters "Brother," the character 82 being the text string indicating the entered characters may be displayed in the tape image 81.

In S21, as shown in FIG. 3, if the CPU 401 determines that no operation to enter a character is performed (S21: NO), the flow proceeds to S25. In S25, the CPU 401 determines whether an operation to enter a command to start printing is performed through the print key in the keyboard 5. If the CPU 401 determines that the operation to enter the command is performed (S25: YES), the flow proceeds to S27.

In S27, the CPU 401 determines the printing apparatus 1 is feasible to print the characters according to the entered command when the following two (2) requirements are met. That is: (1) information concerning the entered characters is stored in the RAM 404; and (2) the setup information meets the printable condition. In this regard, the CPU 401 may determine that the latter requirement (2) is met in a method similar to the determination made in S17. That is, the CPU 401 may determine the printable condition applied to the type of the tape determined in S11 based on the printability information stored in the flash memory 405. Further, the CPU 401 may determine whether the plurality of settings designated in the setup information stored in the flash memory 405 should meet the printable condition.

If both of the two requirements are met, the CPU 401 determines that the printing apparatus 1 is feasible to print the characters according to the setup information (S27: YES). In S29, the CPU 401 generates print data, which is used to print the characters indicated in the information stored in the RAM 404 based on the setup information stored in the flash memory 405. Further, the CPU 401 stores the generated print data in the flash memory 405. In S31, the CPU 401 drives the driving circuits 407, 408 according to the print data stored in the flash memory 405 to print the characters on the cover film. Further, the CPU 401 manipulates the base tape to be bonded to the cover film to produce a label. The flow returns to S21.

On the other hand, in S27, if at least one of the two requirements is not met, or if neither of the two requirements is met, the CPU 401 determines that the printing apparatus 1 is not feasible to print the characters in conformity with the setup information (S27: NO). The flow proceeds to S33. In S33, the CPU 401 displays an alert image to notify the user of the infeasibility of printing in the display device 4. The CPU 401 may stop displaying the alert image after a predetermined length of time (e.g., one second), and the flow returns to S21. For example, the CPU 401 may display an alert image 85 (see FIG. 6) containing a text string "Print Unavailable" in the editor area 8A of the editorial screen 8.

In S25, as shown in FIG. 3, if the CPU 401 determines that no operation to the print key to enter the print command is performed (S25: NO), the flow proceeds to S35. In S35, the CPU 401 determines whether an operation to enter a command to display a setup window (see FIG. 8) is performed through the setup key in the keyboard 5. If the CPU 401 determines that the operation to enter the command through the setup key is performed (S35: YES), the flow proceeds to S37. In S37, the CPU 401 conducts a setup process (see FIG. 7).

The setup process will be described below with reference to FIG. 7. In S51, the CPU 401 displays the setup window 9 (see FIG. 8) in the editorial screen 8. The setup window 9 is a subordinate window, through which a setting for one of the plurality of setup items may be designated or changed. In the following description, the one of the plurality of setup items, of which setting is changeable through the setup window 9, will be referred to as a subject setup item.

Details of the setup window 9 will be described below with reference to FIG. 8. The setup window 9 may be presented in a form of a balloon. The setup window 9 may include a rectangular part 9A and an associating part 9B. The associating part 9B has a shape of a triangle with a peak pointing at the icon 83 that indicates a setting for a subject setup item. The rectangular part 9A in the setup window 9 is divided vertically into two (2) areas by a divider line 90. An area lower than the divider line 90 may be referred to as a first selective area 90A, and an area higher than the divider line 90 may be referred to as a second selective area 90B.

The second selective area 90B displays a current subject setup item 94 being a text string indicating the subject setup item. For example, in FIG. 8, as the current subject setup item 94, a text string "Font" indicating the subject setup item "font" is displayed in the second selective area 90B. According to the present embodiment, the setup item that may be subject for setup immediately after the operation to the setup key (S35: YES) is "font;" therefore, in S51, the text string "Font" may be displayed in the setup window 9 as the current subject setup item 94. In the second selective area 90B, further, an option mark 95 may be displayed on a right-hand side of the current subject setup item 94. The option mark 95 may be a sign of a rightward arrow.

The first selective area 90A displays a first setting indication 91A and a second setting indication 91B, which indicate a setting related to the subject setup item. The first setting indication 91A may be presented in a form of a text string that indicates a setting for the subject setup item. The second setting indication 91B may be a sample alphabet, for example, "A" in an appearance according to the setting for the subject setup item. For example, in FIG. 8, a sample alphabet "A" drawn in "Helsinki" font (see "first setting indication 91A") for the subject setup item "font" (see "current subject setup item 94") is displayed as the second setting indication 91B. Further, in the first selective area 90A, on a right-hand side of the first setting indication 91A and the second setting indication 91B, displayed is a scroll bar 92, which is movable vertically.

The associating part 9B indicates association of one of the icons 83A-83D in the icon 83, that indicates the current setting for the subject setup item, with the setup window 9 being displayed. In the following description, the one of the icons 83A-83D in the icons 83 that indicates the current setting for the subject setup item will be called as a subject icon 83 (subject icon 83A, 83B, 83C, or 83D). The associating part 9B may be extended upward from an upper edge and a widthwise central area of the rectangular part 9A. For example, in FIG. 8, the associating part 9B in the setup window 9 is directed at the subject icon 83A corresponding to the subject setup item "font." In other words, the associating part 9B associates the subject icon 83A with the setup window 9. In the following description, the setup window 9, through which a setting for the subject setup item may be designated, will be called as the setup window 9 for the subject setup item.

Figure 7:
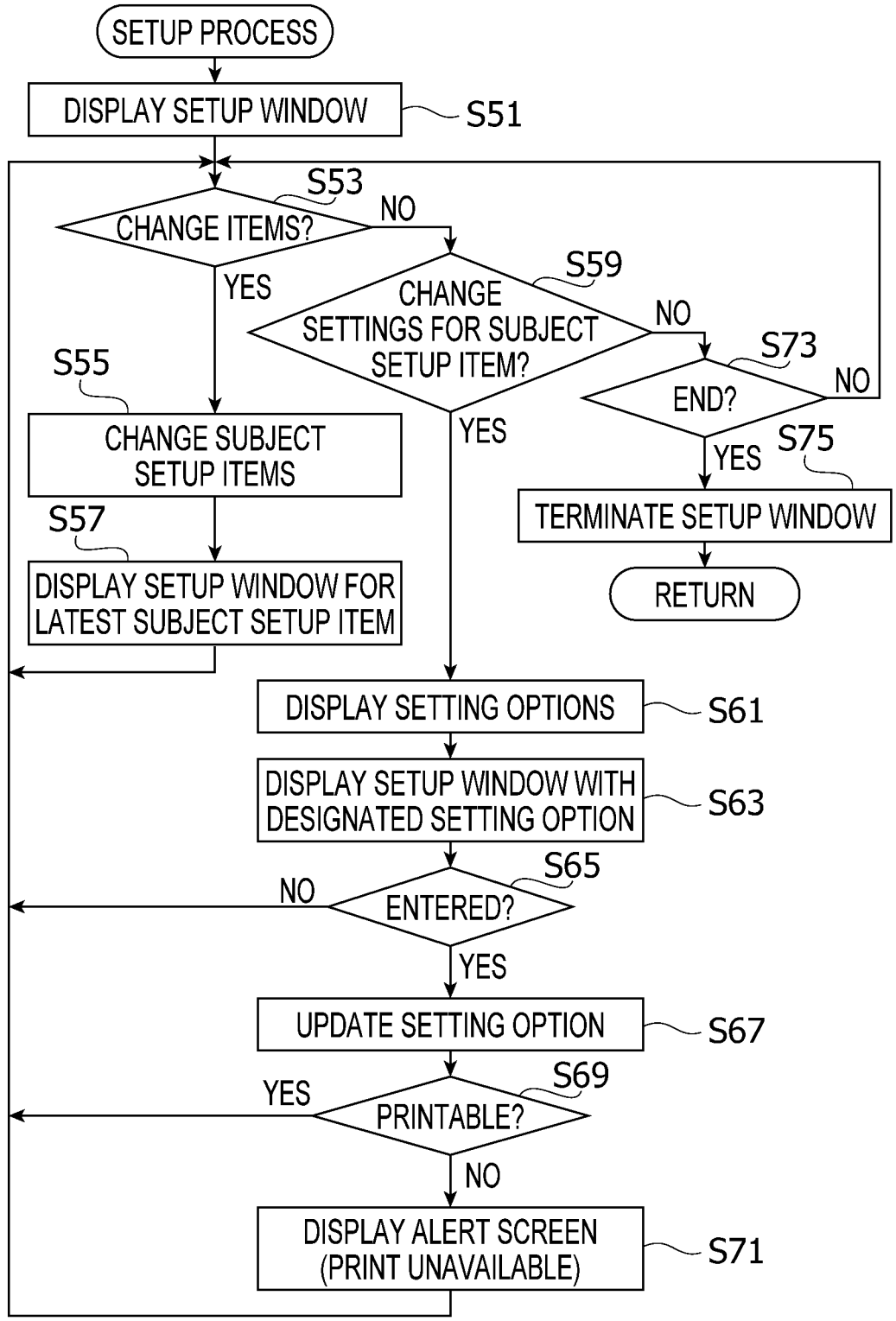
FIG. 7 is a flowchart to illustrate a flow of steps in a setup process to be conducted in the printing apparatus according to the exemplary embodiment of the present disclosure.

Following S51, after the setup window 9 (see FIG. 8) is displayed, as shown in FIG. 7, in S53, the CPU 401 determines whether an operation to one of the direction keys in the keyboard 5 that corresponds to the option mark 95 is performed to enter a command to change subject setup items. If the CPU 401 determines that the operation to the direction key to change the subject setup items is performed (S53: YES), the flow proceeds to S55. In S55, the CPU 401 changes the subject setup items according to the direction key having been operated. The CPU 401 specifies a setting for the latest subject setup item based on the setup information stored in the flash memory 405. In S57, the CPU 401 displays a setup window 9 for the latest subject setup item in the editorial screen 8. The setup window 9 includes the current subject setup item 94 being a text string that indicates the latest subject setup item. The setup window 9 further includes the first setting indication 91A being a text string that indicates the setting specified in S55. Further, the setup window 9 includes the second setting indication 91B being the sample alphabet "A" drawn according to the setting specified in S55.

Figure 8:
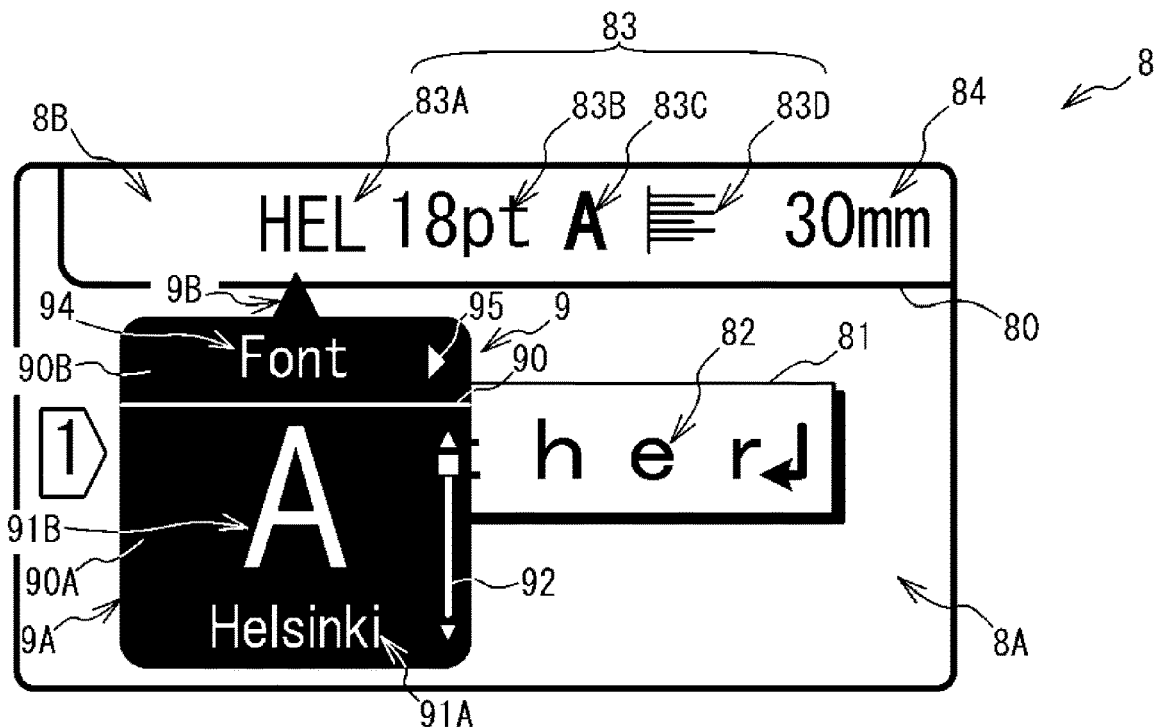
FIG. 8 is an illustrative view of the editorial screen displaying a setup window in the printing apparatus according to the exemplary embodiment of the present disclosure.
Figure 9:
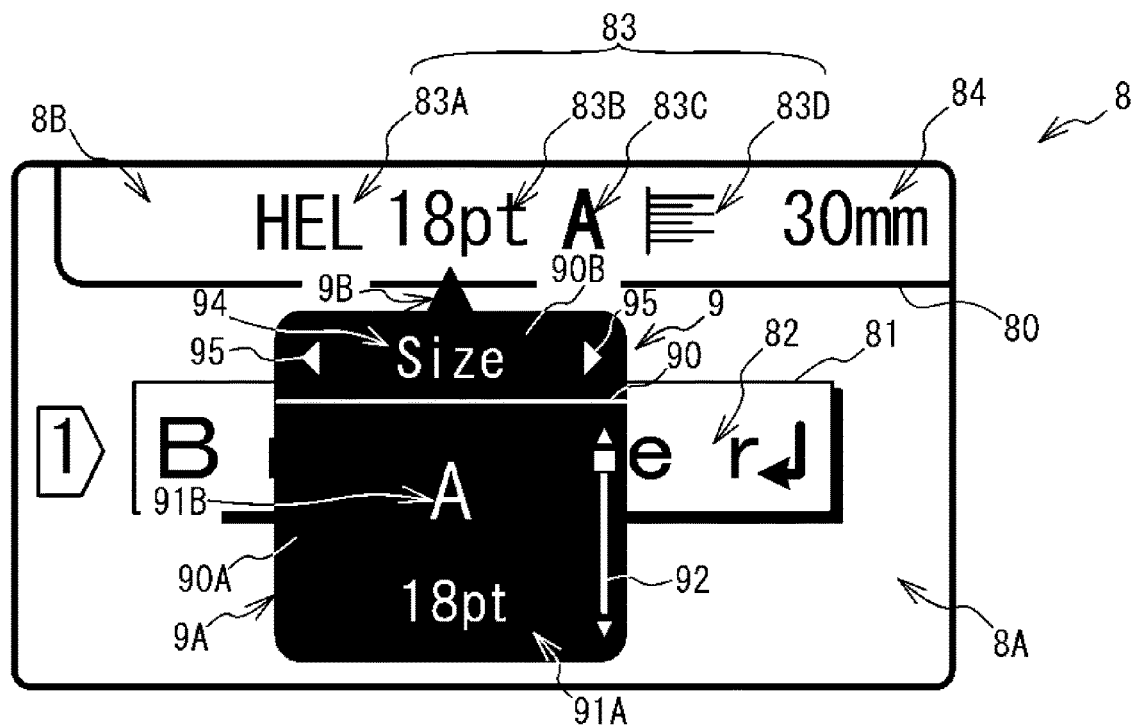
FIG. 9 is another illustrative view of the editorial screen displaying the setup window in the printing apparatus according to the exemplary embodiment of the present disclosure.
Figure 10:
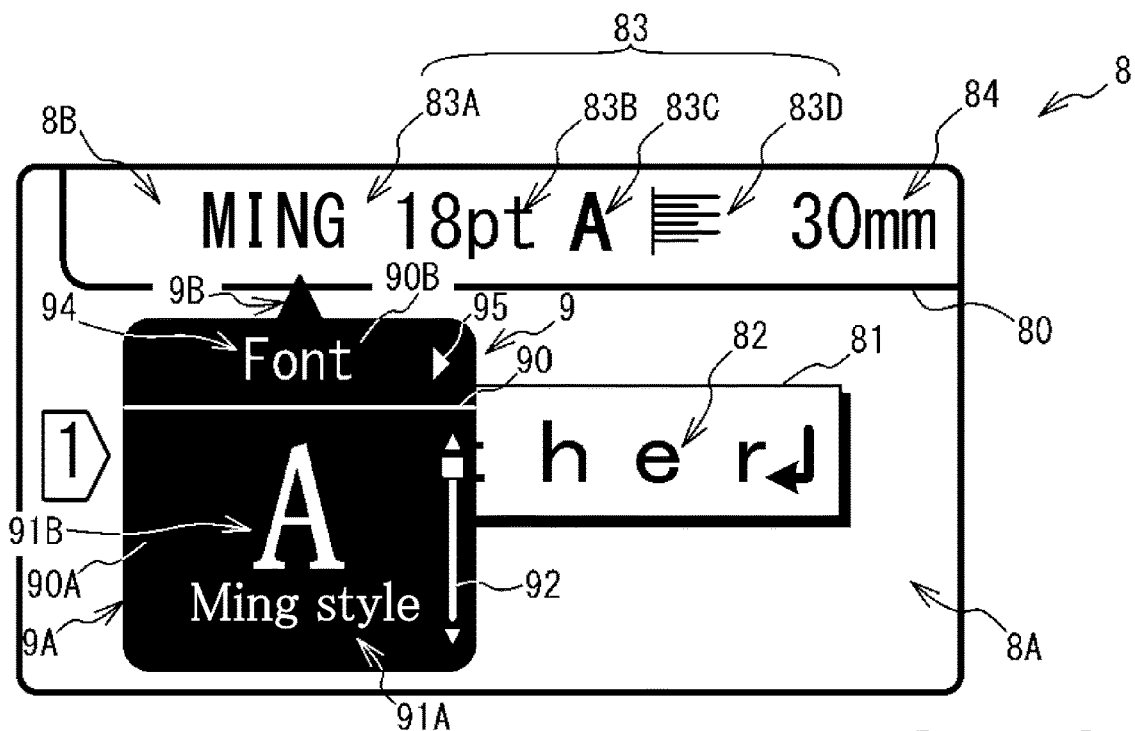
FIG. 10 is another illustrative view of the editorial screen displaying the setup window in the printing apparatus according to the exemplary embodiment of the present disclosure.

For example, while the setup window 9 for the subject setup item "font" as shown in FIG. 8 is displayed, the user may press the rightward direction key that corresponds to the option mark 95 being the rightward arrow. In response to the operation to the rightward direction key, the CPU 401 may change the subject setup items from the setup item "font" to the setup item "size" corresponding to the icon 83B, which adjoins rightward the subject icon 83A corresponding to the setup item "font." The CPU 401 may display the setup window 9 for the latest subject setup item "size" in the editorial screen 8 (FIG. 9). As shown in FIG. 9, the setup window 9 for the latest subject setup item "size" shows the current subject setup item 94 being a text string "Size." The setup window 9 displays the first setting indication 91A being a text string that indicates the setting "18 points" for the subject setup item "size." Further, the setup window 9 displays the second setting indication 91B being the sample alphabet "A" drawn in the size of 18 points.

The subject icon 83B corresponding to the subject setup item "size" is arranged in the rightward position with respect to the icon 83A corresponding to the setup item "font." Therefore, the setup window 9 for the latest subject setup item "size" is displayed at a position shifted rightward from the setup window 9 (see FIG. 8) for the former subject setup item "font." In other words, a widthwise position of the setup window 9 is adjusted to a position straight below the subject icon 83. Therefore, a distance between the subject icon 83B and the associating part 9B in the setup window 9 is shorter than a distance between the other icons 83A, 83C, 83D than the subject icon 83B and the associating part 9B in the setup window 9.

While solely the option mark 95 is displayed on the right-hand side of the current subject setup item 94 in the second selective area 90B in the setup window 9 for the subject setup item "font," in the second selective area 90B in the setup window 9 for the subject setup item "size," displayed may be an option mark 95 on a left-hand side, in addition to the right-hand side, of the current subject setup item 94. The option mark 95 on the left may be a sign of a leftward arrow. For example, while the setup window 9 for the subject setup item "size" is displayed, when an operation to the leftward direction key corresponding to the leftward option mark 95 is performed, the subject setup items may be changed from the setup item "size" to the setup item "font," of which setting is represented by the icon 83A adjoining leftward the subject icon 83B. Thus, the selective mark(s) 95 may indicate the direction key(s) that is provided to the user to change the subject setup items.

In S53, as shown in FIG. 7, if the CPU 401 determines that no operation to the direction key to change the subject setup items is performed (S53: NO), in S59, the CPU 401 determines whether an operation to either the upward key or the downward key in the keyboard 5 is performed to change the settings for the subject setup item. Meanwhile, in the first selective area 90a in the setup window 90, displayed is the scroll bar 92, which is movable upward or downward according to the operation to the upward key or the downward key. Therefore, the user may intuitively recognize that the settings for the subject setup item is changeable by pressing the upward or downward key. Thus, the CPU 401 displaying the setup window 90 may accept the user's operation for changing the settings for the subject setup item.

In S59, when the CPU 401 accepts the user's operation to the direction key to change the settings for setup item (S59: YES), the flow proceeds to S61. In S61, the CPU 401 specifies a plurality of setting options for the subject setup item based on the option information stored in the flash memory 405. Further, the CPU 401 provisionally selects the plurality of setting options sequentially one by one according to the pressing operations to the upward or downward key from the user. In S63, the CPU 401 displays the setup window 9 with the provisionally selected setting option among the plurality of setting options in the editorial screen 8. The displayed setup window 9 includes the first setup indication 91A being the text string that describes the provisionally selected setting option. Further, the setup window 9 includes the second setting indication 91B being the sample alphabet "A" drawn according to the provisional setting option.

For example, while the setup window 9 for the subject setup item "font" with the setting of "Helsinki" as shown in FIG. 8 is displayed in the editorial screen 8, the user may press the downward key. In response to the user's operation to the downward key, a plurality of setting options "Helsinki" and "Ming style" for the subject setup item "font" may be specified based on the option information. In this example, the setting option "Ming style" rather than "Helsinki" which is indicated in the first setting indication 91A may be provisionally selected. Accordingly, the setup window 9 may show the first setting indication 91A containing a text string indicating the provisionally selected setting option "Ming style" (see FIG. 10). Further, the setup window 9 may show the second setting indication 91B containing the sample alphabet "A" drawn in the Ming style.

Following S63, as shown in FIG. 7, in S65, the CPU 401 determines whether an operation to the enter key in the keyboard 5 is performed. If the CPU 401 determines that an operation to the cancellation key rather than the enter key is performed (S65: NO), the CPU 401 determines that an operation to cancel the setup option designated among the plurality of setting options in S61 is entered. The CPU 401 may designate the previous setting for the subject setup item based on the setup information stored in the flash memory 405. The CPU 401 restores the first setting indication 91A and the second setting indication 91B displayed in the setup window 9 through S63 to the designated previous indication. The flow returns to S53.

On the other hand, in S65, if the CPU 401 determines that an operation to the enter key is performed (S65: YES), the CPU 401 accepts the setup option selected through S61 as a latest setting to replace the previous setting. In S67, the CPU 401 updates the setup information in the flash memory 405 to designate the setting option selected in S61 to be the setting for the subject setup item. The flow proceeds to S69.

In S69, the CPU 401 determines the printable condition for the tape type, which was determined in S11 (see FIG. 3), based on the printability information stored in the flash memory 405. The CPU 401 may determine whether the plurality of setting options included in the setup information stored in the flash memory 405 should meet the printable condition to determine printability of the printing apparatus 1. If the CPU 401 determines that all the settings designated in the setup information meet the printable condition, the CPU 401 determines that the printing apparatus 1 is feasible to print according to the setup information (S69: YES). The flow returns from S69 to S53. If the CPU 401 determines that at least one of the plurality of settings does not meet the printable condition, the CPU 401 determines that the printing apparatus 1 is infeasible of printing the characters according to the setup information (S69: NO). In S71, the CPU 401 displays an alert image to notify the user of the infeasibility of printing in the display device 4. The CPU 401 may stop displaying the alert image after a predetermined length of time (e.g., one second), and the flow returns to S53. For example, the CPU 401 may display an alert image 85 (see FIG. 6) containing a text string "Print Unavailable" in the display device 4.

In S59, if the CPU 401 determines that no operation to the direction keys to change the settings for the subject setup item is performed (S59: NO), in S73, the CPU 401 determines whether an operation to terminate display of the setup window 9, e.g., pressing the setup key in the keyboard 5 once again, is performed. If the CPU 401 determines that no operation to terminate the setup window 9 is performed (S73: NO), the flow returns to S53. If the CPU 401 determines that the operation to terminate the setup window 9 is performed (S73: YES), in S75, the CPU 401 terminates display of the setup window 9. The CPU 401 terminates the setup process, and the flow returns to the main process (see FIG. 3). As shown in FIG. 3, the CPU 401 returns from S37 in the setup process to S21.

In S35, if the CPU 401 determines that no operation to the setup key to enter the command to display the setup window 9 is entered (S35: NO), the flow proceeds to S39. In S39, the CPU 401 determines whether an operation, e.g., pressing, to the power key in the keyboard 5 is performed. If the CPU 401 determines that no operation to the power key is performed (S39: NO), the flow returns to S21. If the CPU 401 determines that an operation to the power key is performed (S39: YES), the CPU 401 ends the main process.

[Usability and Effectiveness]

As described above, the CPU 401 in the printing apparatus 1 may display the icons 83 including the plurality of icons 83A-83D, which indicate settings for the plurality of setup items, in the guidance area 8B of the editorial screen 8 (S15). Therefore, the user may recognize the current settings for the plurality of setup items by the icons 83A-83D in the icons 83. Further, the CPU 401 may display the text string indicating the characters to be printed as the character 82 in the editor area 8A in the editorial screen 8 (S23). The CPU 401 may, when the print key is pressed in S25, print the text string in the character 82 on the tape (S31).

When the setup key is pressed (S35: YES), the CPU 401 may display the setup window 9 in the editorial screen 8 (S51). Therefore, the user may designate one of the setup options for the subject setup item to be the setting for the subject setup item through the setup window 9 (S67). In this regard, the setup window 9 includes the associating part 9B, which indicates the association between the subject icon 83 and the current setup window 9. Therefore, the user attempting to designate a setup option for a subject setup item may recognize the setup window 9 corresponding to the subject icon 83 easily.

Meanwhile, a widthwise position of the setup window 9 may be adjusted so that the associating part 9B of the setup window 9 may be arranged straight below the subject icon 83. Therefore, a distance between the subject icon 83 and the associating part 9B of the setup window 9 is smaller than a distance between the remainder of the icons 83 other than the subject icon 83 and the associating part 9B. Thus, the user may recognize the correspondence between the setup window 9 and the subject icon 83 intuitionally. Further, the setup window 9 may be displayed in a form of a balloon with a leader that extends from the subject icon 83 so that the user may recognize the correspondence between the setup window 9 and the subject icon 83 by the associating part 9B being the leader.

Further, the setup window 9 includes the first setting indication 91A in the first selective area 90A, in which the text string may describe the setting in the subject setup item. When either the upward or downward key is pressed while the setup window 9 is being displayed (S59: YES), the CPU 401 may provisionally select the plurality of setting options for the subject setup item one-by-one sequentially (S61) and display the text string indicating the selected setting option as replacing first setting indication 91A (S63). Thereafter, when the enter key is pressed (S65: YES), the CPU 401 may employ the selected setting option as the setting for the subject setup item (S67). Thus, the available setting options may be displayed sequentially in the first setup indication 91A so that the user may select one of the available setting options smoothly, and the setting option for the subject setup item may be employed as the setting for the subject setup item.

The setup window 9 further includes the second selective area 90B, in which the current subject setup item 94 may be displayed. When either the leftward or rightward key is pressed while the setup window 9 is being displayed (S53: YES), the CPU 401 may change the subject setup items based on the direction of the pressed key (S55). The text string indicating the latest subject setup item may be displayed in the second selective area 90B as the current subject setup item 94 (S57). Thus, the user may switch the subject setup items to be displayed in the second selective area 90B as the current subject setup item 94 by pressing the leftward or rightward key while the setup window 9 is being displayed.

The CPU 401 may determine the type of the tape stored in the tape cassette 30 being in the cassette mount 13 (S11). When the setting option for the subject setup item is selected (S67), the CPU 401 may determine printability in conformity with the type of the tape designated in S11 with reference to the settings (S69). When the CPU 401 determines that printing in conformity with the settings is unavailable with the type of the tape (S69: NO), the CPU 401 may display the alert image 85 in the display device 4 (S71). Thus, the user may recognize that the selected settings may be unavailable through the alert image 85.

The CPU 401 may determine the type of the tape in the tape cassette 30 being in the cassette mount 13 (S11) and may determine printability in conformity with the type of the tape determined in S11 with reference to the setup information stored in the flash memory 405 (S17). When the CPU 401 determines that printing in conformity with the settings in the setup information is unavailable with the type of the tape (S17: NO), the CPU 401 may manipulate the icon 83 representing the setup option that does not meet the printable condition to blink in the display device 4. For example, when the tape cassette 30 installed in the cassette mount 13 is replaced with another tape cassette 30, the tape in the latter tape cassette 30 may not comply with one or more of the settings indicated in the setup information stored in the flash memory 405, and printing may not be conducted. In such an occasion, the user may recognize the setting option that does not comply with the tape in the current tape cassette 30 by the blinking icon 83.

More Examples

Although an example of carrying out the present disclosure have been described, those skilled in the art should recognize that there are numerous variations and permutations of the printing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters.

For example, the setup window 9 may not necessarily be displayed in the form described above but may be displayed in different forms. Modified examples of the setup window 9 will be described below.

Figure 11:
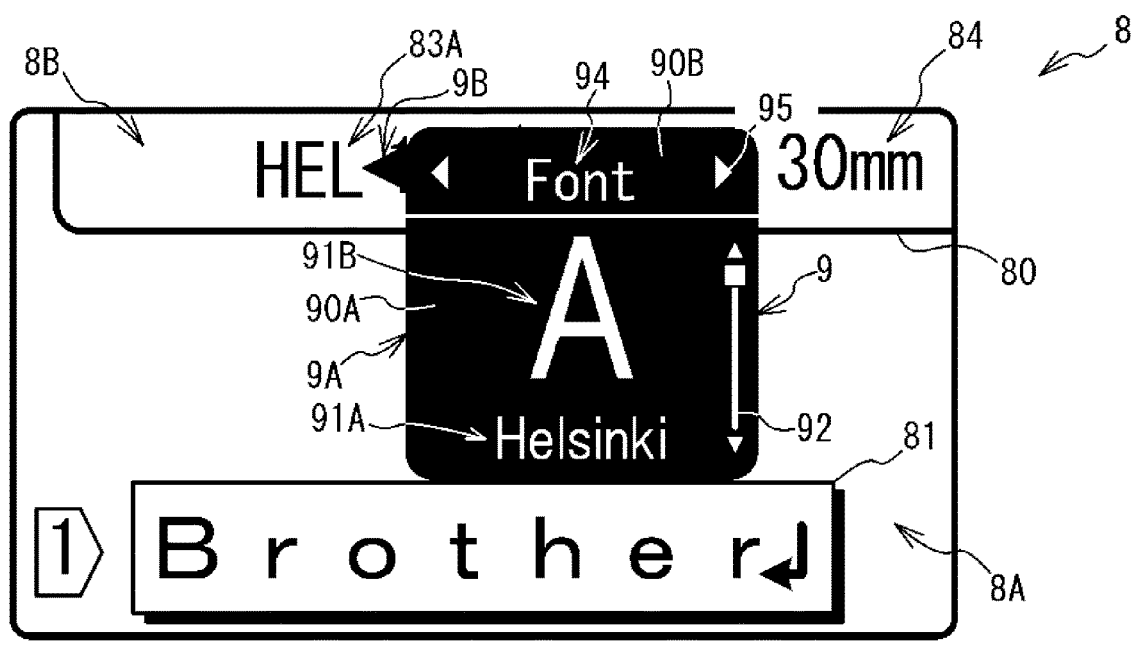
FIG. 11 is a modified illustrative view of the editorial screen displaying the setup window in the printing apparatus according to the exemplary embodiment of the present disclosure.

As shown in FIG. 11, the associating part 9B of the setup window 9 may have a triangular shape extending leftward from an upper-leftward end of the rectangular part 9A to point leftward at the subject icon 83. For example, in FIG. 11, the associating part 9B may be arranged on the right-hand side of the subject icon 83A, which is associated with the subject setup item "font," to point leftward at the subject icon 83A. The subject icon 83A and the setup window 9 may thus be associated with each other by the associating part 9B in the leftward triangular shape. In this arrangement, the setup window 9 in the editorial screen 8 may be located in an upper position with respect to the position of the setup window 9 in the previous embodiment. Therefore, for example, the tape image 81 may be displayed in a lower position in the editorial screen 8A so that the setup window 9 may be prevented from being laid over the tape image 81. In other words, the character 82 in the tape image 81 may be prevented from being visually interrupted by the setup window 9.

Figure 12:
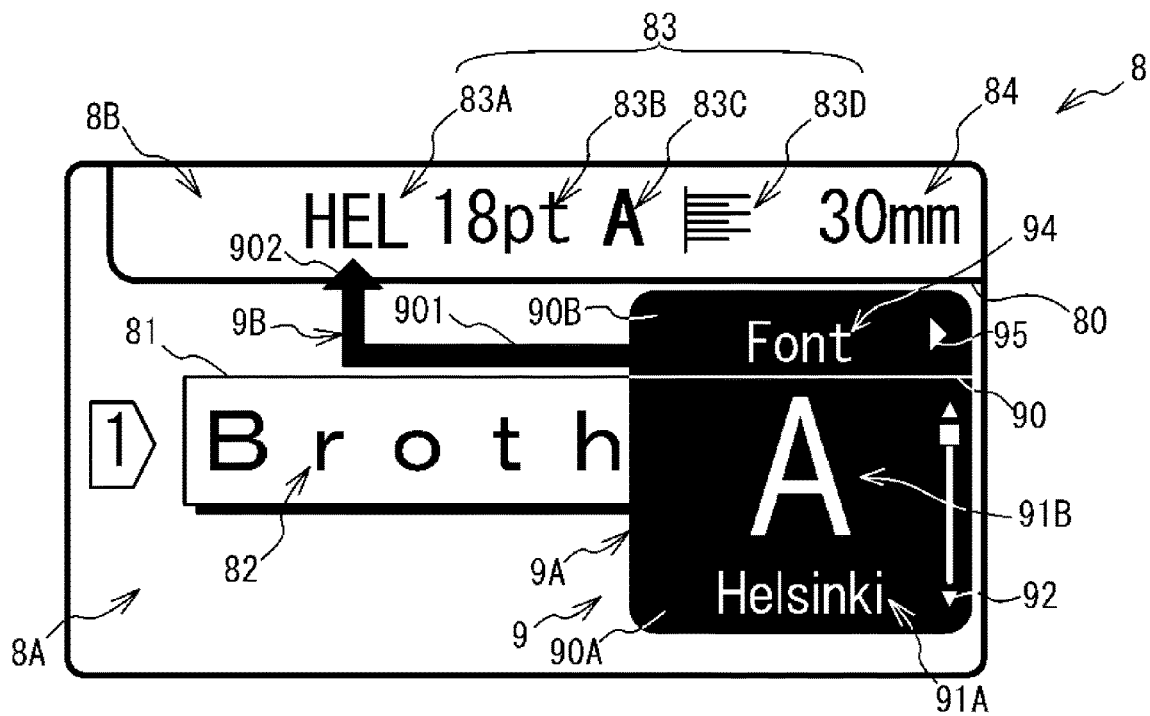
FIG. 12 is another modified illustrative view of the editorial screen displaying the setup window in the printing apparatus according to the exemplary embodiment of the present disclosure.

For another example, as shown in FIG. 12, the associating part 9B may be in a form of an arrow that extends from the rectangular part 9A at the subject icon 83. In FIG. 12, the rectangular part 9A of the setup window 9 may be displayed in a rightward area in the editor area 8A of the editorial screen 8. Meanwhile, the associating part 9B may include a line 901 and an arrow 902. The line 901 may extend leftward linearly from an upper-leftward end of the rectangular part 9A and bend at a position below the subject icon 83A to extend upward. The arrow 902 may be located at an upper end of the line 901. In this arrangement, the user may recognize the association between the setup window 9 and the subject icon 83A by the associating part 9B in the form of an arrow at a glance. Further, a smaller part of the character 82 in the tape image 81 may be laid underneath the setup window 9. In other words, the character 82 in the tape image 81 may be prevented from being visually interrupted by the setup window 9.

For further example, the associating part 9B may not necessarily include the arrow 902 but may have the line 901 alone that connects the setup window 9 with the subject icon 83A.

Figure 13:
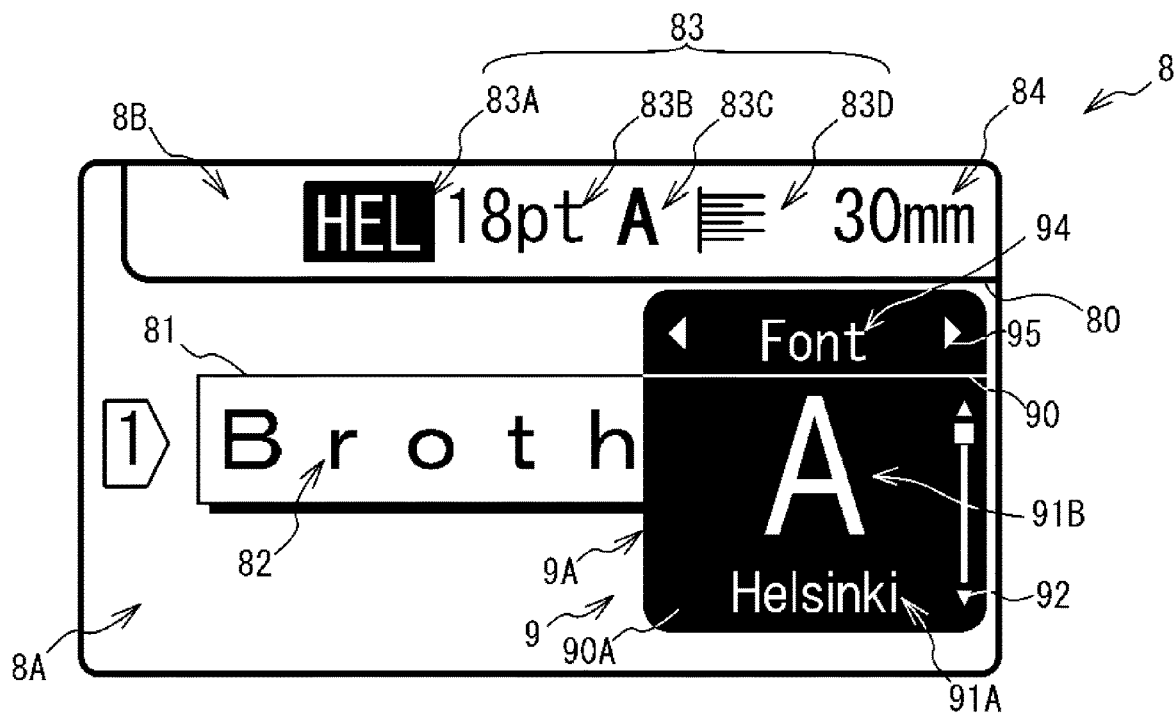
FIG. 13 is another modified illustrative view of the editorial screen displaying the setup window in the printing apparatus according to the exemplary embodiment of the present disclosure.

For another example, as shown in FIG. 13, the setup window 9 may not necessarily include the associating part 9B, but the association between the setup window 9 and the subject icon 83A may be indicated by highlighting the subject icon 83A. The subject icon 83A may be highlighted by, for example, chromatically reversing the icon 83 and a background area thereof. In this method, the user may recognize the association between the setup window 9 and the subject icon 83A at a glance. Further, some of the images in the editorial screen 8 may be prevented from being laid over or visually interrupted by the associating part 9B.

For another example, the editorial screen 8 including the setup window 9 may not necessarily be displayed in the display device 4 of the printing apparatus 1 but may be displayed in a display unit of the external device 7 connected with the printing apparatus 1. The external device 7 may generate print data, which is used to manipulate the printing apparatus 1 to print the character 82 including the text string being displayed in the editor area 8A in the editorial screen 8. The printing apparatus 1 may print the character 82 based on the print data achieved from the external device 7 through the external interface 409.

For another example, the icons 83 may not necessarily include symbols representing the settings for the setup items but may include symbols representing setup items. When the icons 83 include symbols representing the setup items, the settings for the setup items may not necessarily be expressed by the icons 83.

For another example, indication in the first selective area 90A in the setup window 9 may not necessarily be limited to the first setting indication 91A, which represents the setting for the subject setup item, but the first selective area 90A may display one or more other setting options for the subject setup item in addition to the first setting indication 91A. For example, the user may press the upward or downward key to select one of the setting options being displayed in the first selective area 90A.

For another example, indication in the second selective area 90B in the setup window 9 may not necessarily be limited to the current subject setup item 94, but the second selective area 90B may include one or more other optional setup items in addition to the subject setup item 94. For example, the user may press the leftward or rightward key to select one of the optional setup items being displayed in the second selective area 90B.

For another example, in the previous embodiment described above, the CPU 401 displays in S19 (see FIG. 3) the icon 83 associated with the setting, which is determined not to meet the printable condition, in blinks. However, the setting that is determined not to meet the printable condition may not necessarily be indicated in blinks but may be indicated in, for example, an alert image in the editorial screen 8. Meanwhile, in S33, the CPU 401 may not necessarily display the alert image to notify the user of the printing infeasibility in the display device 4, but, for example, the icon 83 associated with the setting that is determined not to meet the printable condition may be displayed in blinks.

For another example, the setup items, of which settings are not indicated by the icon 83, such as "character width," "leading," and "underline," may be presented to the user through setup windows which are not associated with the icon 83. Such setup windows may be displayed, for example, in response to the leftward or rightward key being pressed while the setup window 9 is being displayed. For example, when the rightward key is pressed while the setup window 9 for the subject setup item "alignment" is displayed, a setup window, through which the settings for "character width," "leading," and "underline" may be designated, may be displayed.

What is claimed is:

1. A display device, comprising:
    a screen configured to display images;
    a memory storing a plurality of setup items,
        each of the setup items being information concerning a setting for a character to be printed on a printable medium; and
    a controller connected with the screen and the memory, the controller being configured to:
        control the screen to display the character to be printed;
        control the screen to display a plurality of icons, each of which identifies one of the plurality of setup items;
        generate a computer implemented graphical user interface comprising a setup window, that simultaneously displays
            a subject setup item, which is one of the plurality of setup items, and
            one of plurality of setting options for the subject setup item,
            in association with a subject icon identifying the subject setup item among the plurality of icons being displayed,
        wherein the setting options are displayed one-at-a-time such that only one of the setting options is displayed in the setup window at any time;
        control the screen to display the setup window, including:
            incorporating, within the setup window, an interactive element configured to, upon selection of the interactive element within the setup window, cause the subject setup item to change from a first item of the plurality of setup items to a second item of the plurality of setup items; and
            modifying the setup window to switch the subject setup item from the first item of the plurality of setup items to the second item of the plurality of setup items, and to display a setting option for the second item of the plurality of setup items in association with another subject icon identifying the second item of the plurality of setup items;
        accept selection of the one of the setting options for the subject setup item through a setting option selection element in the setup window, the setting option selection element configured to, upon selection, change a displayed setting option from a first setting option to a second setting option of the subject setup item; and
        designate the accepted one of the setting options to be the setting for the subject setup item.

2. The display device according to claim 1, wherein the controller is configured to control the screen to display the setup window in a position where a distance between an associating part of the setup window indicating correspondence between the setup window and the subject icon is shorter than a distance between the associating part and the remainder of the plurality of icons other than the subject icon.

3. The display device according to claim 1, wherein the setup window at least includes a selective area, through which the one of the plurality of setting options for the subject setup item is selectable; and wherein the controller is configured to accept the one of the plurality of setting options for the subject item selected through the selective screen as the setting for the subject setup item.

4. The display device according to claim 1, wherein the setup window at least includes a selective screen, through which the subject setup item among the plurality of setup items is selectable; and wherein the controller is configured to control the screen to display the setup window to designate the setting for the subject setup item selected through the selective screen.

5. The display device according to claim 1, wherein each of the plurality of icons indicates the setting for a corresponding one of the setup items.

6. The display device according to claim 1, wherein the setup window is displayed in a form of a balloon associated with the subject icon.

7. The display device according to claim 1, wherein the controller is configured to control the screen to display a line connecting the setup window with the subject icon.

8. The display device according to claim 1, wherein the controller is configured to control the screen to display the subject icon in highlight.

9. The display device according to claim 1, wherein a remainder of the setting options for the subject setup item is displayable in the setup window sequentially one by one in response to a user's input to the controller.

\* \* \* \* \*